Feb. 19, 1929.
M. C. INDAHL
1,702,902
MOLD FOR HOLLOW TYPOGRAPHIC ELEMENTS
Filed July 1, 1927   2 Sheets-Sheet 1
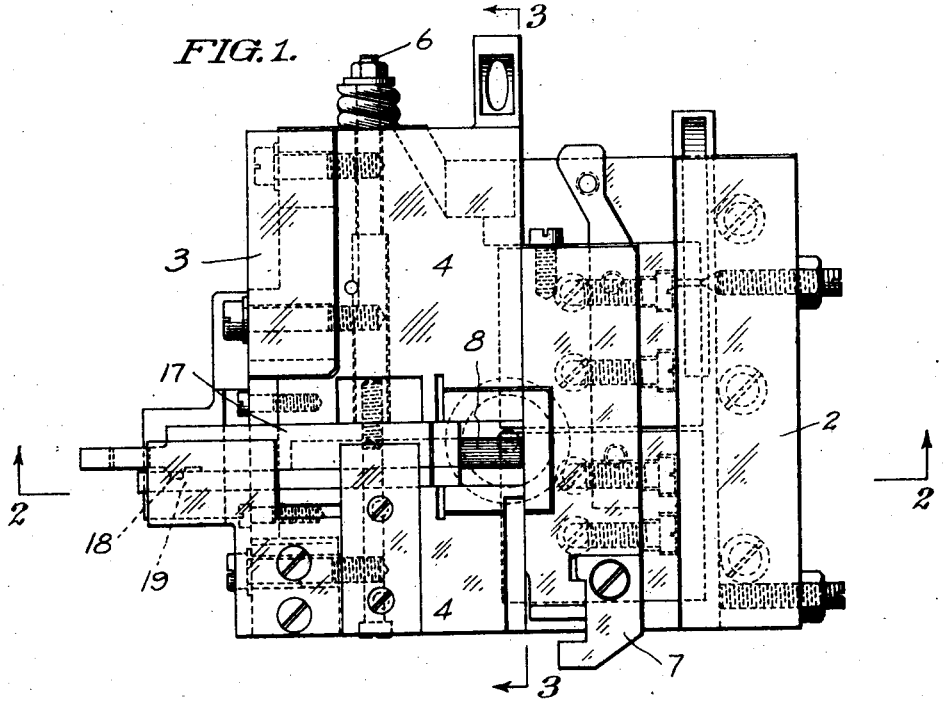
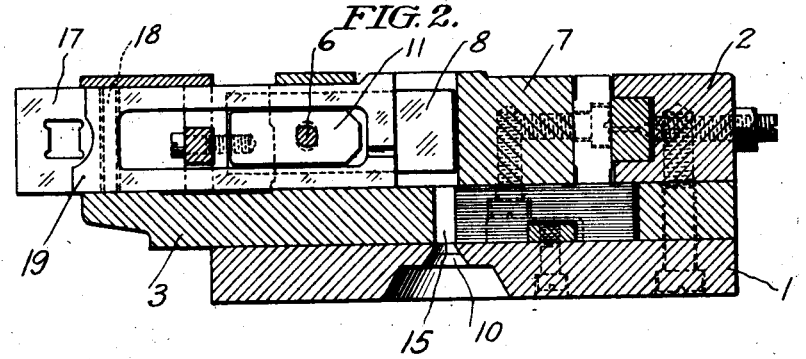
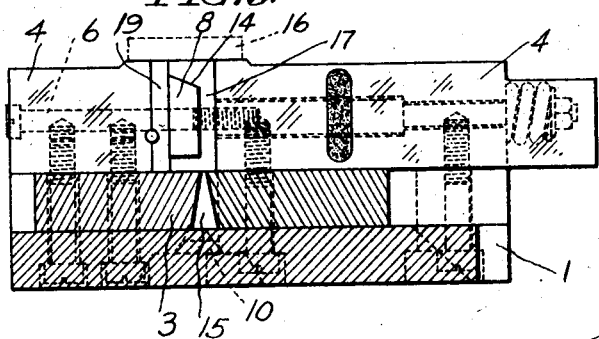
INVENTOR.
Mauritz C. Indahl,
BY
John A. Ferguson
HIS ATTORNEY.

Feb. 19, 1929.
M. C. INDAHL
1,702,902
MOLD FOR HOLLOW TYPOGRAPHIC ELEMENTS
Filed July 1, 1927    2 Sheets-Sheet 2
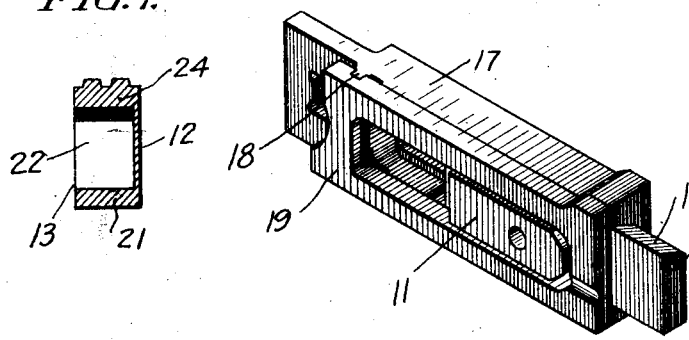
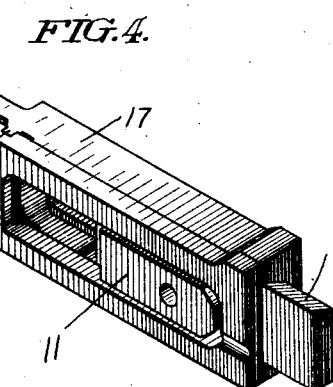
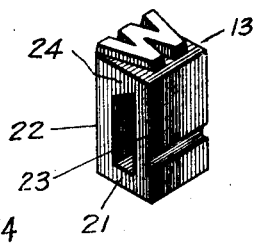
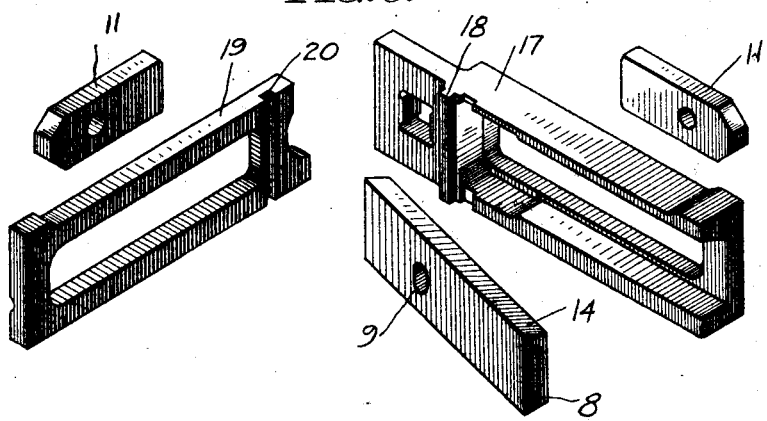
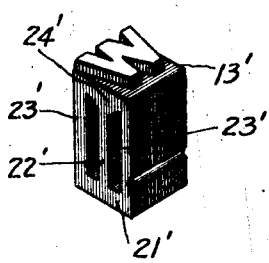
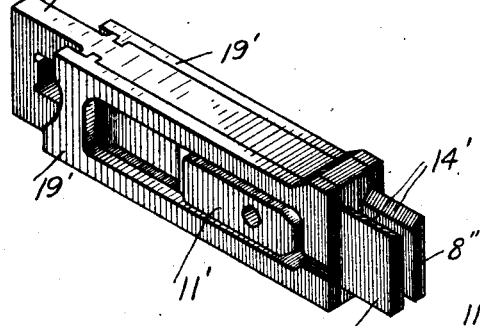
INVENTOR
Mauritz C. Indahl,
BY
John A. Ferguson
HIS ATTORNEY.

Patented Feb. 19, 1929.

1,702,902

UNITED STATES PATENT OFFICE.

MAURITZ C. INDAHL, OF PHILADELPHIA, PENNSYLVANIA, ASSIGNOR TO LANSTON MONOTYPE MACHINE COMPANY, OF PHILADELPHIA, PENNSYLVANIA, A CORPORATION OF VIRGINIA.

MOLD FOR HOLLOW TYPOGRAPHIC ELEMENTS.

Application filed July 1, 1927. Serial No. 202,858.

This invention relates to typographic casting machines and molds therefor and its principal object is to provide a cored mold for a printing element such as printing type, cast from typemetal, which has a cored or hollow body and is of such construction as to successfully stand up under the heavy compressive strains encountered in the processes of stereotyping, printing and the like and at the same time to insure a perfect printing face or surface as an incident to the type casting operation. Other objects will appear in connection with the following description of the embodiments of the invention illustrated in the accompanying drawings forming a part of this specification, in which drawings Fig. 1 is a plan view of a mold.

Fig. 2 is a vertical section approximately on line 2—2 of Fig. 1.

Fig. 3 is a vertical section approximately on line 3—3 of Fig. 1.

Fig. 4 is a perspective view of the mold blade and core.

Fig. 5 is a perspective view of the parts of Fig. 4 shown in separated relation.

Fig. 6 is a perspective view of a type.

Fig. 7 is a vertical section of the type.

Fig. 8 is a perspective view of a modified form of blade and double core, and

Fig. 9 is a perspective view of a type producible with the blade of Fig. 8.

The mold shown in the drawings is similar in its general construction to that shown in U. S. Letters Patent No. 980,960, dated January 10, 1911. Such a mold is well known to those skilled in the art as is also its application to and use in conjunction with a suitable type casting machine such as that marketed by Lanston Monotype Machine Company. A description of such a machine is unnecessary here and the mold shown may be readily identified by referring to the base plate 1, front abutment 2, squaring block 3, side blocks 4, through bolt 6, cross block 7, the nozzle seat and opening 10.

The type element of the present invention is cored or hollow and is shown in Figs. 6, 7 and 9. For producing the hollow or space in the element the mold is equipped with a core piece 8 provided with a hole 9 through which the bolt 6 extends to hold the core 8 fixed relatively to the mold base and side blocks. At the sides of the core are point blocks 11 filling the space between the core and the side blocks 4, the point blocks and the core separating the side blocks a distance corresponding to the point size of the mold. The core 8 is so held that its forward end is spaced slightly from the cross block 7. This space may be more or less and insures the unimpeded operation of the cross block and also allows for flow of metal between the latter and the forward end of the core 8. This metal forms the strengthening end wall 12 of the element 13 (Fig. 7). The top wall 14 of the core 8 is a plane surface sloped so that its lower edge is at that side of the mold cavity at which the molten metal is admitted or, in other words, its lower edge is substantially above the metal entrance through the nozzle opening 10 and the jet opening 15. Due to this slope, the metal, as it flows over the top of the core, is forced by the wedge-shaped form of the space between the top of the core and the matrix which is clamped against the top of the mold and is shown in dotted lines at 16 in Fig. 3, against said matrix with the result that a type face or printing surface is produced which approaches a perfect face.

The mold blade is of course slidable between the side blocks 4. It is made of a main piece 17 provided with a vertical tongue 18 and a side piece 19 provided with a vertical groove 20 to fit the tongue 18. The tongue and groove connection permits the easy assembly of the blade and assures the sliding back and forth of both blade members in unison. When assembled the blade is hollow or open from side to side to accommodate the core 8 and the point blocks 11 and the main piece 17 is provided with an opening at its forward end corresponding to the cross section of the core 8. The side piece 19 fits against the side wall of the core so that the blade is thus built around the core and slides thereover, the core extending beyond the blade into the mold cavity as previously set forth. The mold cavity is formed by the base of the mold and the vertical walls of the side blocks 4, the cross block 7 and the forward end of the mold blade, and the core 8 within the mold cavity is spaced from the base, the side blocks and the cross block. Thus the mold cavity is partly filled by the core.

As shown the bottom wall of the core is parallel with the base, the side walls are parallel to the side walls of the blocks 4 and the end of the core is parallel to the cross block wall. The top wall of the core is sloped as previously set forth at an angle from the horizontal. The core thus extends into the cavity at an angle to one of the vertical walls of said cavity. The metal entrance is at one side of the core as shown in Fig. 3.

In the operation of the mold, the mold blade is drawn back to the proper set size, the matrix is clamped to the mold seat and the nozzle and pump (not shown) come into action to inject molten metal through the nozzle opening 10 and the jet opening 15. The metal within the mold cavity passes up on one side of the core, and impinges on the matrix, the stream then passing up the slope of the core top and being thus wedged almost instantaneously against the full face of the matrix; the stream then turns downwardly at the other side of the core and the bottom space is also filled. The operation of the mold results in extremely dense and heavy types and it is believed that a circulatory movement of the metal has the effect of driving the mold cavity air before the onrushing metal down into the jet, thus leaving the type unusually solid. It has been shown in practice that the weight of the type approaches that of a so-called solid type even though the type of this invention has a relatively large hollow or cored portion. The operation also results in type faces or printing surfaces which are practically perfect, this being attributed to the wedging action caused by the slope of the core and the choked outlet at the thin edge of the wedge: this thin edge is at the upper edge of the sloped top of the core. The type, due to its density, is capable of holding up remarkably well against compression pressures exerted on its face, such as are encountered in the dry mat processes of stereotyping. The hollow type 13 shown in Figs. 6 and 7 has a bottom wall 21, a vertical wall 22, an opposite side wall 23, an end wall 12 and a top wall 24 bearing the printing face and connecting the vertical, side and end walls. This top wall is wedge shaped as seen in vertical section taken at right angles to the side wall 23, the thick part of the wedge being at the meeting of said top wall and said vertical wall 22. This wall 22 is directly above the metal entrance in the base of the mold so that the molten metal is admitted above the core at the large end of the wedge and is forced by the cam action of the top wall of the core against the matrix, there being a choke effect at the thin end of the wedge which is, in the finished type, at the meeting of the top wall 24 and the side wall 23.

In the modification shown in Figs. 8 and 9, a double core is employed and a type 13' having two hollow portions is produced, the metal entrance being central or below the central vertical wall 22'. This type has a bottom wall 21', opposite side walls 23' and a top wall 24', the latter being double wedge shaped, the thick end of each wedge being at the meeting of the top wall with the central vertical wall, and the thin edge at the meeting of the top wall with the opposite side wall. The mold blade shown in Fig. 8 comprises the main piece 17' and the side pieces 19' each connected with the piece 17' by a tongue and groove connection. There are also provided the necessary point blocks 11' and the cores 8' and 8''. Each of the cores has a sloping top wall 14', 14' like the core 8 but the top wall of core 8' slopes one way while that of core 8'' slopes in the opposite direction so that the lowermost edges of these top walls are adjacent but are separated to form a space in which the central wall 22' of the type 13' is cast, this space, when the mold is assembled being above the metal entrance formed by the nozzle opening 10 and the jet opening 15 thereabove.

I claim:

1. A type mold comprising a base provided with an entrance for molten metal, side blocks, a mold blade slidable on said base and between said side blocks, said blocks and the forward end of said blade forming vertical walls of a mold cavity and a core fixed relatively to said base and extending through the forward end of said blade into said cavity, and being spaced from the mold cavity walls formed by said side blocks.

2. A type mold comprising walls forming a cavity, a core extending into the cavity at an angle to one of the vertical walls thereof and a metal entrance through the bottom wall thereof, said core being provided with a sloping top wall the lower edge of which is on the side of the cavity above the metal entrance and the upper edge of which is adjacent to the opposite side of the cavity.

3. A type mold comprising a base provided with an entrance for molten metal, side blocks, a cross block and a mold blade slidable on said base, said blocks and the forward end of said blade forming the vertical walls of a mold cavity, and a fixed core extending through the forward end of said blade into said cavity, the side walls of said core being substantially vertical and the top wall of said core being sloped at an angle from the horizontal.

4. A type mold comprising a base provided with an entrance for molten metal, side blocks, a mold blade slidable on said base and between said side blocks, said blocks and the forward end of said blade forming vertical walls of a mold cavity and a core fixed relatively to said base and extending through the forward end of said blade into said cavity, and being spaced from the mold cavity walls formed by said side blocks and from said base and having a top wall in the form of a sloping plane surface the lower edge of which is substantially above the metal entrance.

MAURITZ C. INDAHL.